(12) United States Patent
Lutz et al.

(10) Patent No.: US 11,543,803 B2
(45) Date of Patent: Jan. 3, 2023

(54) PROCESS CONTROL SYSTEM WITH AN ENGINEERING SYSTEM, AN OPERATOR SYSTEM AND AN ARCHIVE SYSTEM

(71) Applicant: Siemens Aktiengesellschaft, Munich (DE)

(72) Inventors: Benjamin Lutz, Pfinztal (DE); Anna Palmin, Karlsruhe (DE)

(73) Assignee: SIEMENS AKTIENGESELLSCHAFT, Meunchen (DE)

( * ) Notice: Subject to any disclaimer, the term of this patent is extended or adjusted under 35 U.S.C. 154(b) by 0 days.

(21) Appl. No.: 16/404,042

(22) Filed: May 6, 2019

(65) Prior Publication Data

US 2019/0339674 A1 Nov. 7, 2019

(30) Foreign Application Priority Data

May 7, 2018 (EP) .................................... 18171049

(51) Int. Cl.
*G05B 19/418* (2006.01)
(52) U.S. Cl.
CPC ................ *G05B 19/4183* (2013.01)
(58) Field of Classification Search
None
See application file for complete search history.

(56) References Cited

U.S. PATENT DOCUMENTS

| 6,550,057 B1 * | 4/2003 | Bowman-Amuah ... H04L 67/42 717/126 |
| 2005/0159932 A1 | 7/2005 | Thurner |
| 2009/0037872 A1 | 2/2009 | Schnabele et al. |
| 2009/0125129 A1 * | 5/2009 | Eldridge ............ G05B 19/0426 700/86 |
| 2013/0138818 A1 | 5/2013 | Wolf |
| 2014/0025339 A1 | 1/2014 | Mcadam et al. |
| 2014/0173637 A1 | 6/2014 | Becker |
| 2015/0277406 A1 | 10/2015 | Maturana et al. |
| 2016/0154910 A1 | 6/2016 | Altare et al. |
| 2016/0266566 A1 | 9/2016 | Lutz |

(Continued)

FOREIGN PATENT DOCUMENTS

| CN | 1636211 | 7/2005 |
| CN | 102801776 | 11/2012 |

(Continued)

OTHER PUBLICATIONS

Search Report dated Jul. 5, 2021 issued in European Patent Application No. 18171049.2.

*Primary Examiner* — Mohammad Ali
*Assistant Examiner* — Saad M Kabir
(74) *Attorney, Agent, or Firm* — Cozen O'Connor

(57) ABSTRACT

A process control system includes an engineering system for a project configuration of hardware and software components of a process control system, an operator system having a runtime component for operator control and monitoring of a technical process, and an archive system for archiving project configuration inputs of the engineering system and for archiving operator inputs in the operator system, via which a project engineer and/or an operator may be provided with the relationships between engineering-relevant actions or events and runtime-relevant actions or events.

4 Claims, 3 Drawing Sheets

(56) References Cited

U.S. PATENT DOCUMENTS

| | | | |
|---|---|---|---|
| 2017/0235298 | A1 | 8/2017 | Nixon et al. |
| 2017/0236067 | A1 | 8/2017 | Tjiong |
| 2018/0004949 | A1 | 1/2018 | Lutz et al. |
| 2018/0314215 | A9 | 11/2018 | Sangi |

FOREIGN PATENT DOCUMENTS

| | | |
|---|---|---|
| CN | 103576638 | 2/2014 |
| CN | 103870270 | 6/2014 |
| CN | 104238486 | 12/2014 |
| CN | 104950741 | 9/2015 |
| CN | 105005274 | 10/2015 |
| CN | 105654228 | 6/2016 |
| CN | 105938360 | 9/2016 |
| CN | 107085415 | 8/2017 |
| CN | 107548475 | 1/2018 |
| EP | 2811349 | 12/2014 |
| EP | 2942684 | 11/2015 |
| EP | 3067768 | 9/2016 |
| EP | 3264208 | 1/2018 |
| EP | 3285162 | 2/2018 |
| EP | 3306469 | 4/2018 |
| WO | WO 2015/169681 | 11/2015 |

\* cited by examiner

PROCESS CONTROL SYSTEM WITH AN ENGINEERING SYSTEM, AN OPERATOR SYSTEM AND AN ARCHIVE SYSTEM

BACKGROUND OF THE INVENTION

1. Field of the Invention

The invention relates to a process control system with an engineering system, an operator system and an archive system.

2. Description of the Related Art

In process control engineering, user actions are conventionally continuously logged in a chronological manner during the engineering or in the context of the project configuration of the hardware and software components of an automation facility or a process control system. Examples of actions of this kind are the activation/deactivation/configuration of an access protection, the opening or the closing of projects or of libraries, the loading of process objects into a target system (automation device, operator system, . . . ) or the operations for loading and copying modules.

One such logging of engineering user actions (also referred to in the following as ES logging or ES log) is initiated by a suitable activatable option of a software component, where, for example, an activated option "ES protocol active" causes all loading processes of CFC plans (Continuous Function Chart plans) or CFC modules (Continuous Function Chart modules) and/or SFC modules (Sequential Function Chart plans) or SFC modules (Sequential Function Chart modules) to be logged as well. The log or change log, which is conventionally a constituent part of a higher-level log or of a main or system log, can be exported for an evaluation and/or displayed on a display unit. For example, in the context of an action "load entire program", the ES log is provided with a date label, archived as a file in an archive server and subsequently the ES log is deleted from the higher-level log, where the archiving action and the file name used (including path) are captured in the log.

Furthermore, for example, in the action "test mode on", all following actions are logged, which lead to an alteration (value change) in the CPU of an automation device. It is logged as an action, for example, which value has been changed and how (address, old value, new value). Moreover, the parameterization of terminals, the "activate/deactivate forces" and the "force value changes", as well as the switching on and switching off of runtime groups, are conventionally logged in a CFC plan. In an SFC plan, as a rule, the parameterizations of constants in the steps, the parameterizations of constants in the transitions and the parameterizations of constants in the chain or sequence properties are also logged.

The functions explained in relation to the logging (and thus the supervision) of the user activities or the user actions are conventionally summarized under the term "audit trail". In this context, the mechanisms for actualizing the functions in the engineering system differ from those for actualizing in an operator system or in another runtime system. The audit trail functions in an engineering context are separate from the audit trail functions in the runtime context, where furthermore the results of the logging are also archived and evaluated separately from one another in the engineering system and in the operator system (in the runtime). This means that the relationships between the audit trail functions in relation to the engineering system and the audit trail functions with reference to the operator system (runtime system) are not taken into consideration or are ignored, whereby it cannot be determined, or can only be determined in a highly imprecise manner, how and in which sequence over time engineering data has been transferred into the runtime (into the operator system or the automation device). Furthermore, it is thus not possible to determine correct indications of an inconsistent loading (loading the engineering data into the automation device and/or the operator station).

SUMMARY OF THE INVENTION

In view of the foregoing, it is an object of the invention to provide a process control system, via which a user (a project engineer and/or an operator) is provided with the relationships between engineering-relevant actions or events and runtime-relevant actions or events.

This and other objects and advantages are achieved in accordance with the invention by a process control system in which the engineering system includes a runtime component for storing engineering messages corresponding to the project configuration inputs, where the runtime component of the engineering system is time-synchronized with the runtime component of the operator system, where operator messages corresponding with the operator inputs are entered in a runtime component of the operator system, and where the engineering system and the operator system each include an access component for writing their respective messages into the archive system and for reading out engineering and operator messages stored in the archive system.

It is advantageous that an improved audit trail is made possible. For example, the user may be provided with the relationship between the audit trail entries which describe the load sequence in the engineering context, e.g., loading the corresponding engineering data into the automation device first of all, then loading the corresponding engineering data into the operator system, and the audit trail entries that describe the status of the operator system in the runtime context, such as during the loading, operator control and monitoring occurred completely normally or the communication with the operator system was briefly interrupted.

By way of a "collective consideration" and optionally by a correlation of runtime- and engineering-relevant events, as well as optionally based on adequate, integrated correlation rules precisely tailored to the respective process control system and the respective project, as well as by the archiving of all events in a shared archive, it is made possible that in addition to the "pure" capturing of the user activities (who has done what and when) it can be determined how and in which sequence over time the engineering data has been transferred into the operator system. In this context, the statuses in the operator system (e.g., operation and observation occurred completely "normally" during the loading) are taken into consideration in particular. A comprehensive, higher-level analysis which has been integrated into the process control system, both at runtime (in order to determine indications of a possible deliberate or accidental operator error in a timely manner), as well as at a later point in time (e.g., as a basis for optimizing the operating sequences reconstructed based on the historical events or operating reports) is made possible.

By taking into consideration the relationships between engineering data and runtime data, in the engineering context, for example, the following relevant "operating reports or messages" are made particularly possible:

When was which device loaded with changes (at control modules)—how long were inconsistencies between engineering data and runtime data present, Engineering "Go-Online"—"switch CFC to online" and change values in the automation device at modules: "Operator control and monitoring from engineering", Virtualization statuses of devices, Who has loaded which engineering version when—although the engineering version is in another database; reference is however made to it.

In one embodiment of the invention, the runtime component of the engineering system is a constituent part of an engineering server of the engineering system, where the engineering system and the operator system are configured to display the messages stored in their runtime components on their respective clients. To this end, the respective server and the respective clients have suitable visualization components having an active connection, whereby graphical outputs of engineering and operator messages are possible. Each project engineer (operator of the engineering system) and each operator (operator of the operator system) can be shown the changes undertaken in the engineering and at runtime (in the operator system) over the entire history.

For example, the project engineer may check whether operator controls relevant to the system in particular are undertaken at the operator system, in order to decide when it is sensible to load updated engineering changes into the system. An operator may also check which relevant engineering changes have most recently been loaded and to what extent these influence its activity. Furthermore, the checks mentioned as well as the actions to be initiated as a function of the results thereof—based on the results of the analysis carried out over a longer period of time—may be automated in such a comprehensive manner that the respective user (the project engineer in the engineering context or the operator in the runtime context) at most has to approve (e.g. by clicking on a corresponding button) whether a proposed adequate action is to be executed.

In a further embodiment of the invention, the engineering system and the operator system each have an interpreter for detecting the statuses of their respective runtime components and/or for detecting the current project configuration. To this end, for example, there is provision on the respective system for a software component in the form of an interpreter (engineering and operator message interpreter), where these make an "ad-hoc audit trail" available during the project configuration and at runtime. This "ad-hoc audit trail" can give a project engineer or an operator indications of the current project configuration in the engineering or of the status of the runtime components, which may provide assistance during their activity. With a correlation of the engineering messages and operator messages captured at the engineering system and the operator system and merged in a shared archive, "useful" statements can therefore be derived for a project engineer or an operator. In the event that, e.g., it is detected that the loading status of an automation device is inconsistent with the loading status of the operator system, for example, because a module has already been loaded into the automation device, but a module corresponding with this module has not yet been loaded into the operator system, a "useful" statement, which is derived by correlation, may for example read:

"Inconsistent loading status at runtime—new measuring point or new control module "motor_xyz" loaded into the automation device—but operator data corresponding with this module not yet updated in the process image of the operator system".

With suitable project-configurable correlation rules for the interpreter, the statements to be derived and the messages responsible for these are able to be configured in a project-specific manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in greater detail below on the basis of the drawing in which an exemplary embodiment of the invention is illustrated, in which.

DETAILED DESCRIPTION OF THE EXEMPLARY EMBODIMENTS

Figure 1:
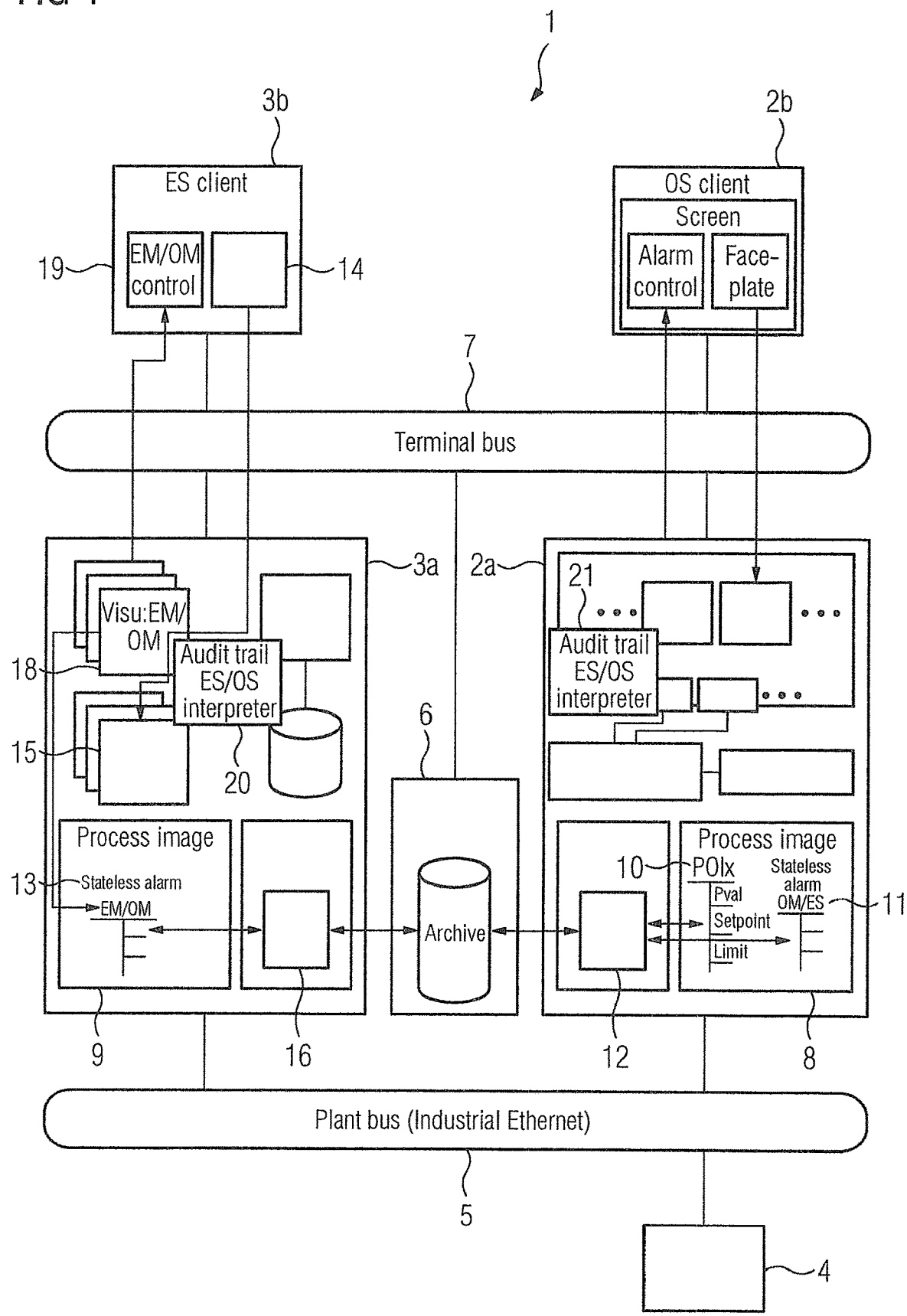
FIG. 1 shows constituent parts of a process control system in accordance with the invention.
Figure 2:
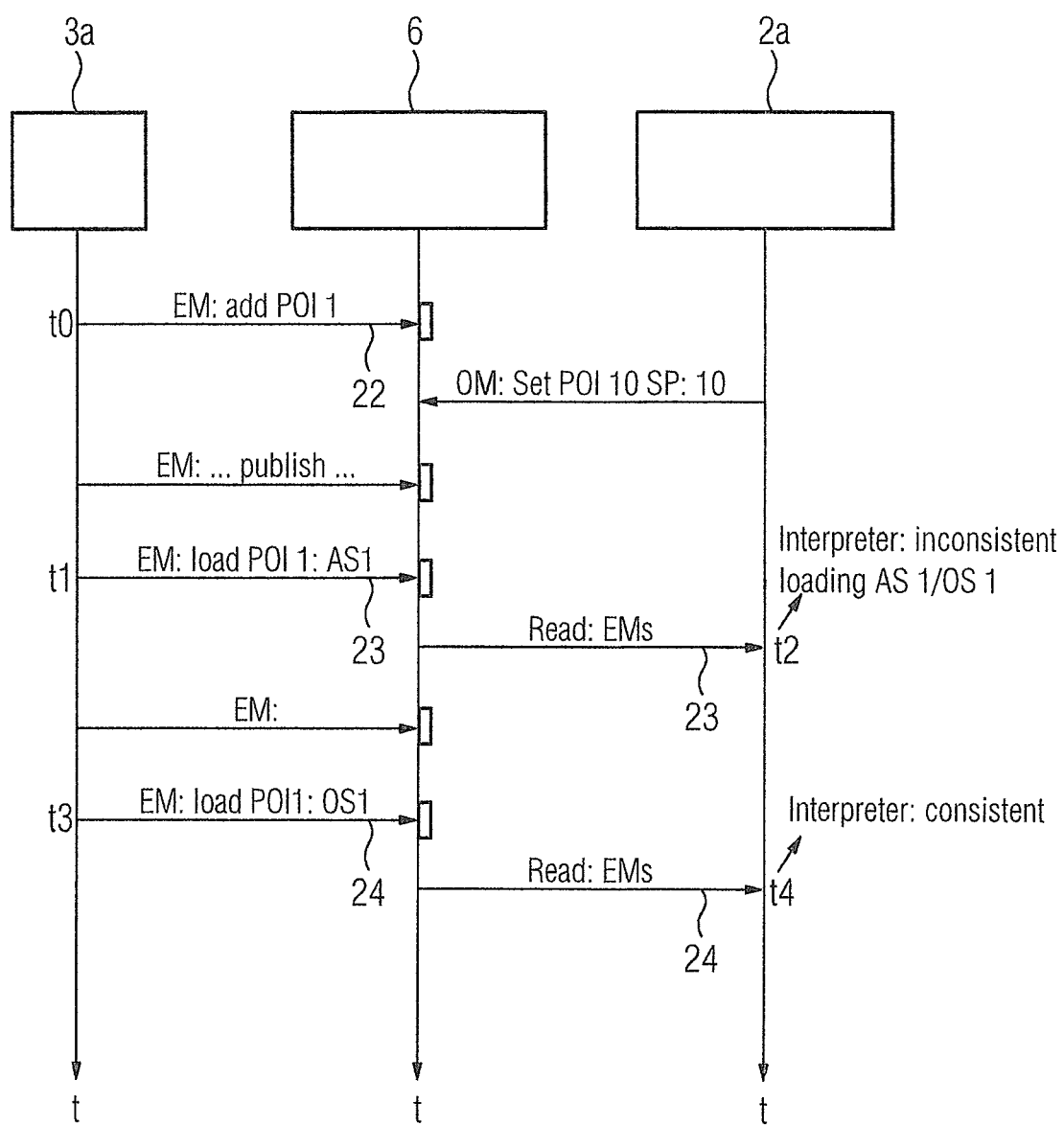
FIGS. 2 and 3 show sequence diagrams in accordance with the invention.
Figure 3:
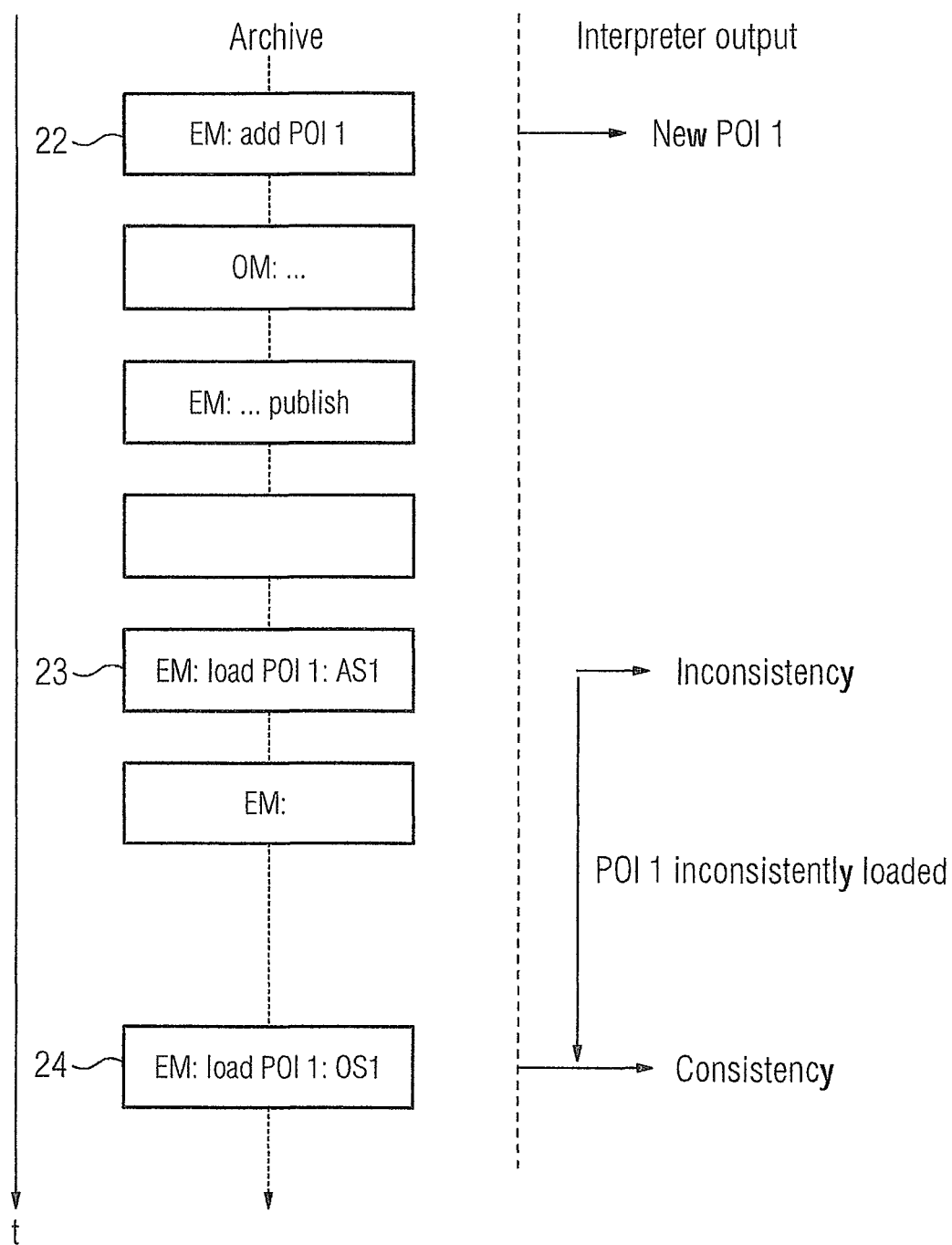

The same parts shown in FIGS. 1 to 3 are provided with the same reference characters.

In FIG. 1, constituent parts of a process control system are referred to with 1, which in the present exemplary embodiment comprises an operator system 2a, 2b, an engineering system 3a, 3b, an automation device 4 as well as an archive server 6. It should be understood the process control system 1 can have a large number of automation devices which, on the one hand, are connected via a plant bus 5 to an operator server 2b of the operator system 2a, 2b as well as to an engineering server 3a of the engineering system 3a, 3b and, on the other hand, via a further bus (not shown here) to decentralized peripherals (likewise not shown here). Connected to these decentralized peripherals are a large number of field devices (sensors, actuators). Furthermore, in the present example, solely an operator system 2a, 2b and an engineering system 3a, 3b are represented. It should be understood, however, further operator systems and further engineering systems may be provided, where conventionally in an operator server and an operator client each form an operator system and an engineering server and an engineering client form an engineering system. In the present exemplary embodiment, the operator system 2a, 2b has the operator server 2a and an operator client 2b and the engineering system 3a, 3b has the engineering server 3a and an engineering client 3b, where the servers 2a, 3a, the clients 2b, 3b and the archive server 6 are connected to a terminal bus 7.

The engineering system 2a, 2b, is provided for the project configuration of the hardware and software components of the process control system 1 and the operator system is provided for the operator control and monitoring of a technical process or a technical system to be controlled, where both the operator server 2a and the engineering server 3a have a runtime component in the form of a process image 8, 9 in each case. These process images 8, 9 are updated in the context of the process control, i.e. at runtime or during runtime operation. With reference to the process image 8 or the operator server 2*a*, process objects or process object instances 10 in the process image 8 are supplied with current process input and output values, where the automation device 4 feeds these values to the operator server 2*a*. Furthermore, at runtime, operator messages corresponding with the operator control inputs of an operator are entered into a message object 11 of the process image 8 of the operator server 2*a*. With a suitable software component 12 of the operator server 2*a*, it is possible for the operator server 2*a* to be able to have read and write access to the archive server 6, in order to store operator messages in the archive server 6 and/or to read engineering messages of the engineering system 3*a*, 3*b* stored there.

The process image 9 of the engineering server 3*a*, which is time-synchronized with the process image 8 of the operator server 2*a*, likewise has a message object 13, into which engineering messages corresponding with operator control or project configuration inputs are entered, where in the present exemplary embodiment entering the engineering messages is indicated via components 14, 15 of the engineering server 3*a* and the engineering client 3*b*. The engineering server 3*a* is furthermore likewise provided with a suitable software component 16, which makes it possible for the engineering server 3*a* to be able to have read and write access to the archive server 6, in order to store engineering messages in the archive server 6 and/or to read the engineering and/or operator messages of the operator system 2*a*, 2*b* stored there.

This shared and chronologically correct archiving of relevant operator control inputs of an operator and project configuration inputs of a project engineer means that the prerequisite is fulfilled that both the project engineer (user or operator of the engineering system 3*a*, 3*b*) and the operator (user or operator of the operator system 2*a*, 2*b*) can be shown the relevant changes undertaken in both systems at runtime over the entire history. In order to display these relevant changes or the engineering and/or operator messages graphically, in the present exemplary embodiment the engineering server 3*a* has a visualization component 18 and the engineering client 3*b* has a further visualization component 19 having an active connection with the visualization component 18 for graphically preparing the messages.

In order to be able to further provide an "ad-hoc audit trail" in the context of the project configuration and at runtime, which can give a project engineer or an operator indications of the current project configuration in the engineering or indications of the status of the runtime components, which may provide assistance during their activity, the engineering server 3*a* and the operator server 2*a* are each provided with a message interpreter 20, 21 for interpreting the engineering and the operator messages. With these interpreters 20, 21, by correlating the engineering messages and operator messages that are combined in the archive server 6, "useful" statements are derived for the project engineer and/or the operator. Such a "useful" statement may read, for example: "Inconsistent loading status at runtime— new measuring point or process object instance (POI) "motor_xyz" loaded into the automation device 4—this measuring point, however, has not yet been updated in the process image 8 of the operator system 2*a*, 2*b*".

To explain this in greater detail, to this end reference is made to the FIGS. 2 and 3, in which sequence diagrams are shown.

FIG. 2 shows write and read accesses of the operator and the engineering server 2*a*, 3*a* to the archive server 2, and FIG. 3 shows outputs of the message interpreter 21 of the operator server. It is assumed that at a point in time t0 an engineering message 22 is entered into the archive server 6. For example, this message may contain the information that the project configuration data has been changed and therefore a process object instance (POI), e.g., a process object instance in the form of a measuring point, a tank or valve, of a sensor or actuator, has been added. Furthermore, it is assumed that the process object instance has initially been loaded into the automation device 4, where an engineering message 23 corresponding therewith has been entered into the archive server 6 at a point in time t1. At a point in time t2, the operator server 2*a* reads out the engineering message 23 from the archive server 6, where the message interpreter 21 of the operator server 2*a* detects that the load status of the automation device 4 is inconsistent with the load status of the operator system 2*a*, 2*b*.

In the event that the process object instance or an object corresponding with the process object is also loaded into the operator system 2*a*, 2*b*, which the engineering system 3*a*, 3*b* shows by an engineering message 24 which is stored in the archive server 6 at a point in time t3, the message interpreter 21 of the operator server 2*a* can detect at a point in time t4, as a result of the read-out engineering message 24, that the load statuses of the automation device 4 and the operator system 2*a*, 2*b* are consistent with each other.

With the above-described measures, a comprehensive, correlatable and exact audit trail is actualized, which substantially takes into consideration engineering-relevant and runtime-relevant events collectively and in equal measure and all events persist in a shared archive. Indications of problems and corresponding adequate problem solutions can be determined in an efficient manner. The measures for actualizing the exact audit trail including any correlation rules are integrated into the engineering and operator system that is present in any case, so that no further system is required for the performance of correlations. Through the use of an intelligent interpreter for the interpretation of the engineering and operator messages (audit trail EM/OM interpreter), the risk of an operator error or an unplanned incorrect action, which has been caused by a wrong decision by a project engineer or operator, is considerably reduced. Otherwise, with the above-described measures, the requirements of the Industrial Security Standard IEC 62443 with regard to the capturing of all user activities are met, which includes inter alia a necessary prerequisite for the corresponding certifications, the significance of which is always rising.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A process control system comprising:
an engineering system for a project configuration of hardware and software components of the process control system;
an operator system including a runtime component for operator control and monitoring of a technical process; and
an archive system for archiving project configuration inputs of the engineering system and for archiving operator inputs in the operator system;
wherein the engineering system includes a runtime component for storing engineering messages corresponding to the project configuration inputs, the runtime component of the engineering system being time-synchronized with the runtime component of the operator system;
wherein operator messages corresponding with the operator inputs are entered in the runtime component of the operator system; and
wherein the engineering system and the operator system each include an access component for writing their respective messages into an improved audit trail comprising the respective messages of the engineering system and the operator system which are stored in the archive system and for reading out engineering and operator messages from the improved audit trail comprising the respective messages of the engineering system and the operator system which are stored in the archive system, the improved audit trail providing relationships between audit trail entries which describe a load sequence in an engineering context and audit trail entries which describe a status of the operator system in a runtime context.

2. The process control system as claimed in claim 1, wherein the runtime component of the engineering system forms a constituent part of an engineering server of the engineering system; and wherein the engineering system and the operator system are configured to display messages stored in their runtime components on their respective clients.

3. The process control system as claimed in claim 1, wherein the engineering system and the operator system each include an interpreter for detecting at least one of (i) statuses of their respective runtime components and (ii) a current project configuration.

4. The process control system as claimed in claim 2, wherein the engineering system and the operator system each include an interpreter for detecting at least one of (i) statuses of their respective runtime components and (ii) a current project configuration.

* * * * *